(12) United States Patent
Neylan et al.

(10) Patent No.: US 10,190,877 B2
(45) Date of Patent: Jan. 29, 2019

(54) LEVEL APPARATUS

(71) Applicants: Edward Neylan, Plymouth, MA (US);
Edward Wheeler, East Meadow, NY (US)

(72) Inventors: Edward Neylan, Plymouth, MA (US);
Edward Wheeler, East Meadow, NY (US)

(*) Notice: Subject to any disclaimer, the term of this patent is extended or adjusted under 35 U.S.C. 154(b) by 141 days.

(21) Appl. No.: 15/231,237

(22) Filed: Aug. 8, 2016

(65) Prior Publication Data
US 2017/0038206 A1 Feb. 9, 2017

Related U.S. Application Data

(60) Provisional application No. 62/201,631, filed on Aug. 6, 2015.

(51) Int. Cl.
*G01C 9/06* (2006.01)
*G01C 9/12* (2006.01)

(52) U.S. Cl.
CPC ........ *G01C 9/06* (2013.01); *G01C 9/12* (2013.01)

(58) Field of Classification Search
CPC .......................................................... G01C 9/06
USPC ......... 33/227, 290, 371, 374, 375, 392–394, 33/666
See application file for complete search history.

(56) References Cited

U.S. PATENT DOCUMENTS

| | | | | |
|---|---|---|---|---|
| 3,321,248 | A * | 5/1967 | Williamson | E21D 9/10 299/1.3 |
| 3,505,739 | A * | 4/1970 | Abrams | B25H 7/04 33/227 |
| 4,198,759 | A * | 4/1980 | Wirtanen | G01C 1/00 33/281 |
| 4,333,242 | A * | 6/1982 | Genho, Sr. | G01C 15/004 33/227 |
| 4,492,029 | A * | 1/1985 | Tanaka | G01C 9/06 33/366.14 |
| 4,798,087 | A * | 1/1989 | Takeda | G01C 9/12 33/366.23 |
| 5,067,245 | A * | 11/1991 | Millard | A63B 71/06 33/286 |
| 5,606,802 | A * | 3/1997 | Ogawa | G01B 11/26 33/276 |
| 6,139,053 | A * | 10/2000 | Knox | G01C 9/06 200/61.45 R |
| 6,371,626 | B1 * | 4/2002 | Addona | G01C 15/002 33/520 |
| 6,986,209 | B2 * | 1/2006 | Cook | G01C 15/008 33/286 |
| 7,216,436 | B2 * | 5/2007 | Whitworth | B23Q 3/183 29/464 |
| 8,209,874 | B1 * | 7/2012 | Tribble | G01C 15/06 33/227 |

(Continued)

*Primary Examiner* — Tania Courson
(74) *Attorney, Agent, or Firm* — Bay State IP, LLC

(57) ABSTRACT

A multipurpose, non-fluid, electronic level mechanism featuring an inhibitor, and emitter and a receiver. The inhibitor is mounted from the inhibitor bracket and in operation blocks a laser from the emitter to the receiver, unless the device is at a level position on a selected surface. If the device is at a level position on the selected surface, the laser from the emitter passes through an aperture in the inhibitor and is receiver by the receiver, which indicates that the device is level on the exterior of the device's body.

17 Claims, 22 Drawing Sheets

(56) References Cited

U.S. PATENT DOCUMENTS

2002/0062570 A1* 5/2002 Palumbo, II ......... G01C 15/002
33/286
2017/0122735 A1* 5/2017 Finkelstein .......... G01C 15/006

* cited by examiner

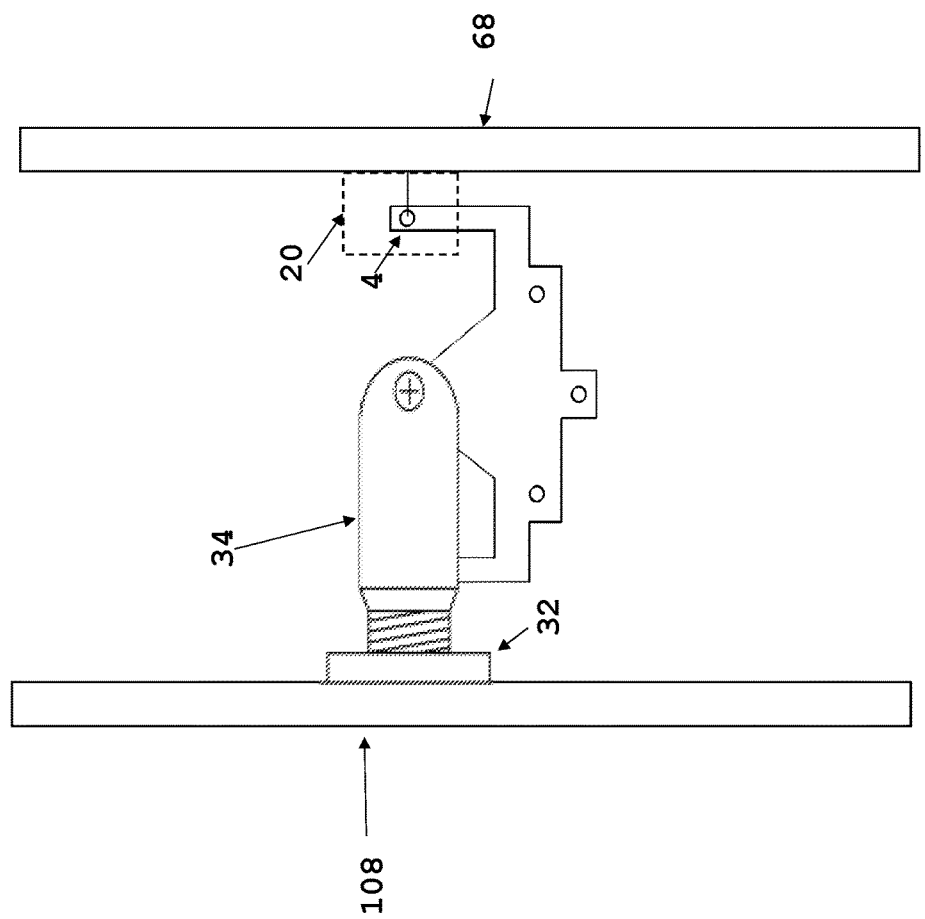

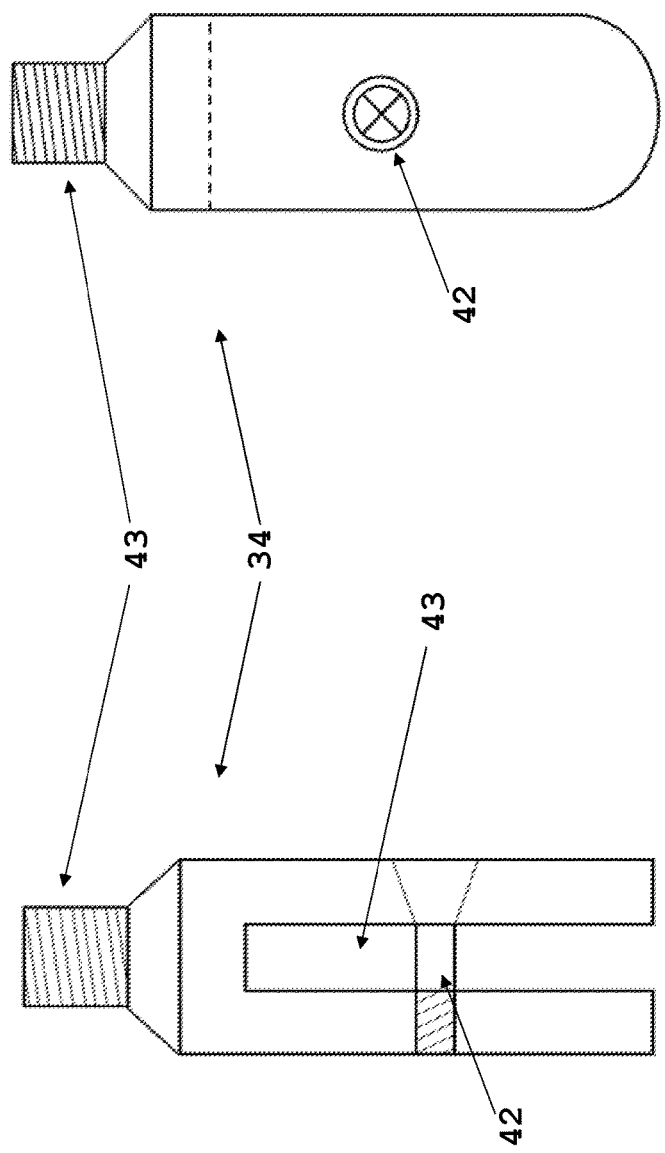

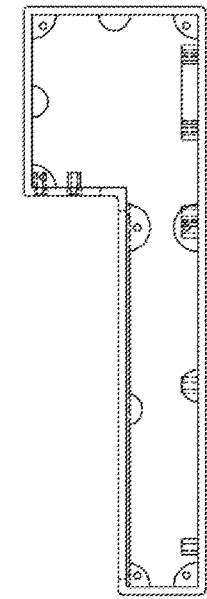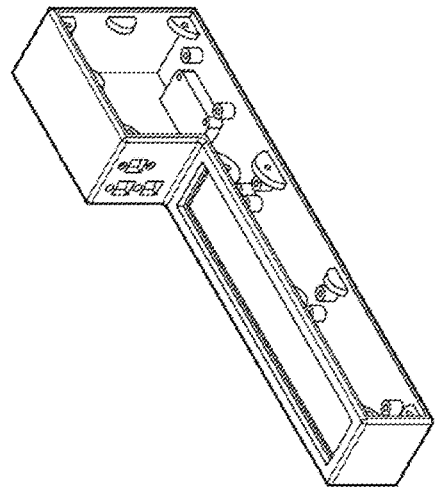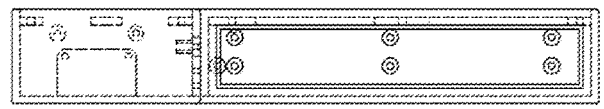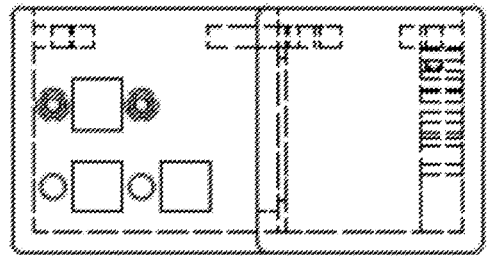
Fig. 15C
Fig. 15D
Fig. 15B
Fig. 15A

LEVEL APPARATUS

CROSS REFERENCE TO RELATED APPLICATION

This application claims priority to and takes the benefit of U.S. Provisional Application Ser. No. 62/201,631 filed on Aug. 6, 2015, the contents of which are herein incorporated by reference.

BACKGROUND OF THE INVENTION

1. Field of the System

The present system pertains to construction equipment and more particularly leveling apparatuses and electronic laser levels for use in leveling objects at a variety of angles.

2. Description of Concurrent Art

Levels are commonly used home and professional construction projects. Concurrently, the most commonly used level is a liquid level, which is generally a tube filled with liquid to the point where a small air bubble is still present. When a common level is laid horizontally at rest, the air bubble will align with the center of the tube when the device is horizontally level. In many embodiments, there is usually some sort of marking feature located on the center of the level and disposed to help determine when the device is level. If the device is not level the bubble will move to one side of tube, making it easy for the operator to determine which way to adjust the object they are attempting to level. These devices can be time consuming to use, inaccurate and difficult to read, particularly in dimly lit environments.

Electronic levels employ various sensing elements and circuitry such as accelerometers and sudden motion sensors to determine whether a device is level. Often these devices rely on internal circuitry to determine the angle of the device. Various forms of electronic levels exist that suffer from disadvantages of a lack of portability, inaccuracy in determining the angle; of the device, or fragile designs that are unsuitable for many practical uses.

SUMMARY OF THE INVENTION

The instant series of system, method and series of apparatuses, as illustrated herein, are clearly not anticipated, rendered obvious, or even present in any of the prior art mechanisms, either alone or in any combination thereof. A versatile system, method and series of apparatuses for leveling objects. Thus the several embodiments of the instant apparatus are illustrated herein.

In its broadest interpretation, this disclosure describes the methods and systems for the electronic leveling mechanism, a primary goal of which is to provide a level that will overcome the shortcomings of the concurrent art fluid levels and electronic levels. It is yet another object of the present system to provide a level that quickly and easily level an object at a variety of angles.

Briefly stated, in one embodiment, the present system contemplates a level that comprises an inhibitor, an emitter, and a receiver wherein the emitter sends a signal through the inhibitor to the emitter.

It is an object of the instant system to introduce a system which uses an emitting diode to pass energy through the inhibitor when the predetermined selected position is achieved. The beam passes though the appropriate opening (identified by angle representation internal to the device). The user knows the selected angle by basic math for intermediate angles whereas, the 0, 180 and 90 degree positions are self-evident. It is important to note that the user is not required to enter and angle or other information to use the present system.

The configuration of the present system provides the construction professional or consumer with ease of use and a high degree of accuracy for the completion of construction work by affording easy of measuring operation while concurrently allowing multiple angles to level.

It is an object of the instant system to introduce a system that provide a total viewing capacity of 360 degrees as well as audio signals which are compatible to the 360 degree range whereas the viewing angle for bubble levels is at most 180 degrees on each side but actual usable viewing angle is 20 to 25 degrees at most on each side.

It is an additional object of the instant system to introduce a system that provides information of a match condition over 360 degrees (both visual and audio), as opposed to normal bubble levels that can only do about +/−30 degrees on each side of level at best.

It is a further object of the instant system to utilize single both a one board (bd) system and a 2 bd system in order to create a small buzzer and a large buzzer system.

There has thus been outlined, rather broadly, the more important features of the electronic laser level in order that the detailed description thereof that follows may be better understood, and in order that the present contribution to the art may be better appreciated. There are additional features of the system that will be described hereinafter and which will form the subject matter of the claims appended hereto.

In this respect, before explaining at least one embodiment of the system in detail, it is to be understood that the system is not limited in its application to the details of construction and to the arrangements of the components set forth in the following description or illustrated in the drawings. The system is capable of other embodiments and of being practiced and carried out in various ways. Also, it is to be understood that the phraseology and terminology employed herein are for the purpose of description and should not be regarded as limiting.

These together with other objects of the system, along with the various features of novelty, which characterize the system, are pointed out with particularity in the claims annexed to and forming a part of this disclosure. For a better understanding of the system, its operating advantages and the specific objects attained by its uses, reference should be made to the accompanying drawings and descriptive matter in which there are illustrated preferred embodiments of the system.

To the accomplishment of the foregoing and related ends, certain illustrative aspects are described herein in connection with the following description and the annexed drawings. These aspects are indicative of the various ways in which the principles disclosed herein can be practice and all aspects and equivalents thereof are intended to be within the scope of the claimed subject matter. Other advantages and novel features will become apparent from the following detailed description when considered in conjunction with the drawings.

BRIEF DESCRIPTION OF THE DRAWING FIGURES

Advantages of the present system will be apparent from the following detailed description of exemplary embodiments thereof, which description should be considered in conjunction with the accompanying drawings, in which:
Having thus described the system in general terms, reference will now be made to the accompanying drawings, which are not necessarily drawn to scale, and wherein:

FIG. 5C illustrates a front view of the interior of the device in use leveling an object at a 90 degree angle;

FIG. 6A illustrates an embodiment of a hanging mechanism;

FIG. 6B illustrates another embodiment of a hanging mechanism.

Figure 11C:
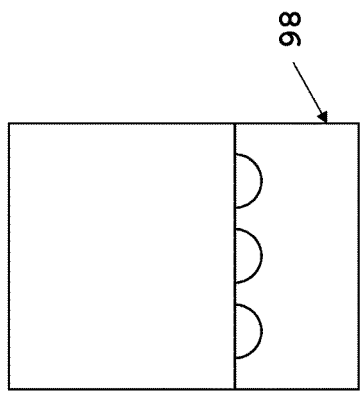
Figure 11B:
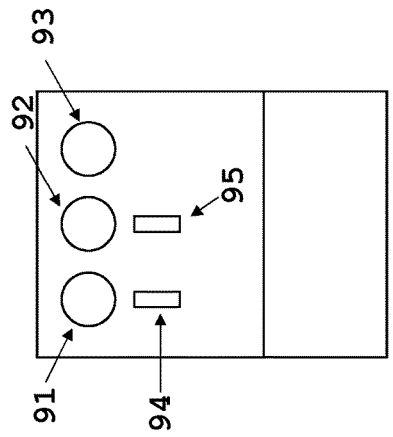
Figure 11A:
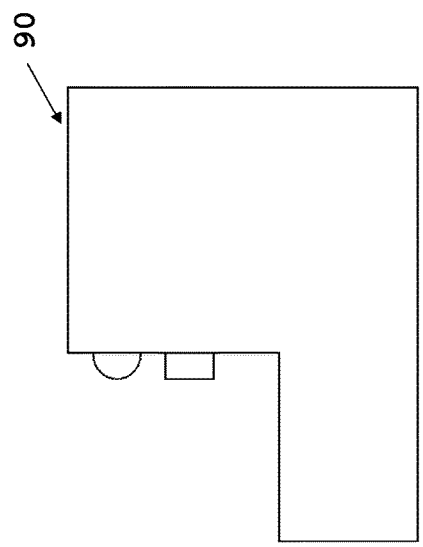
Figure 12A:
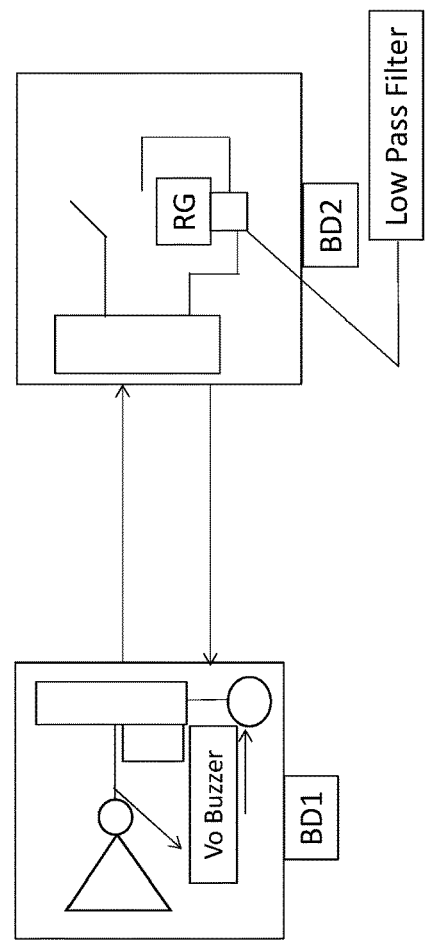
Figure 12B:
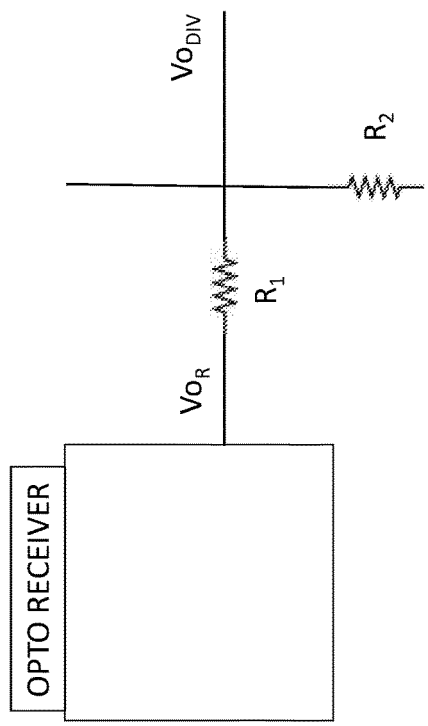
Figure 13:
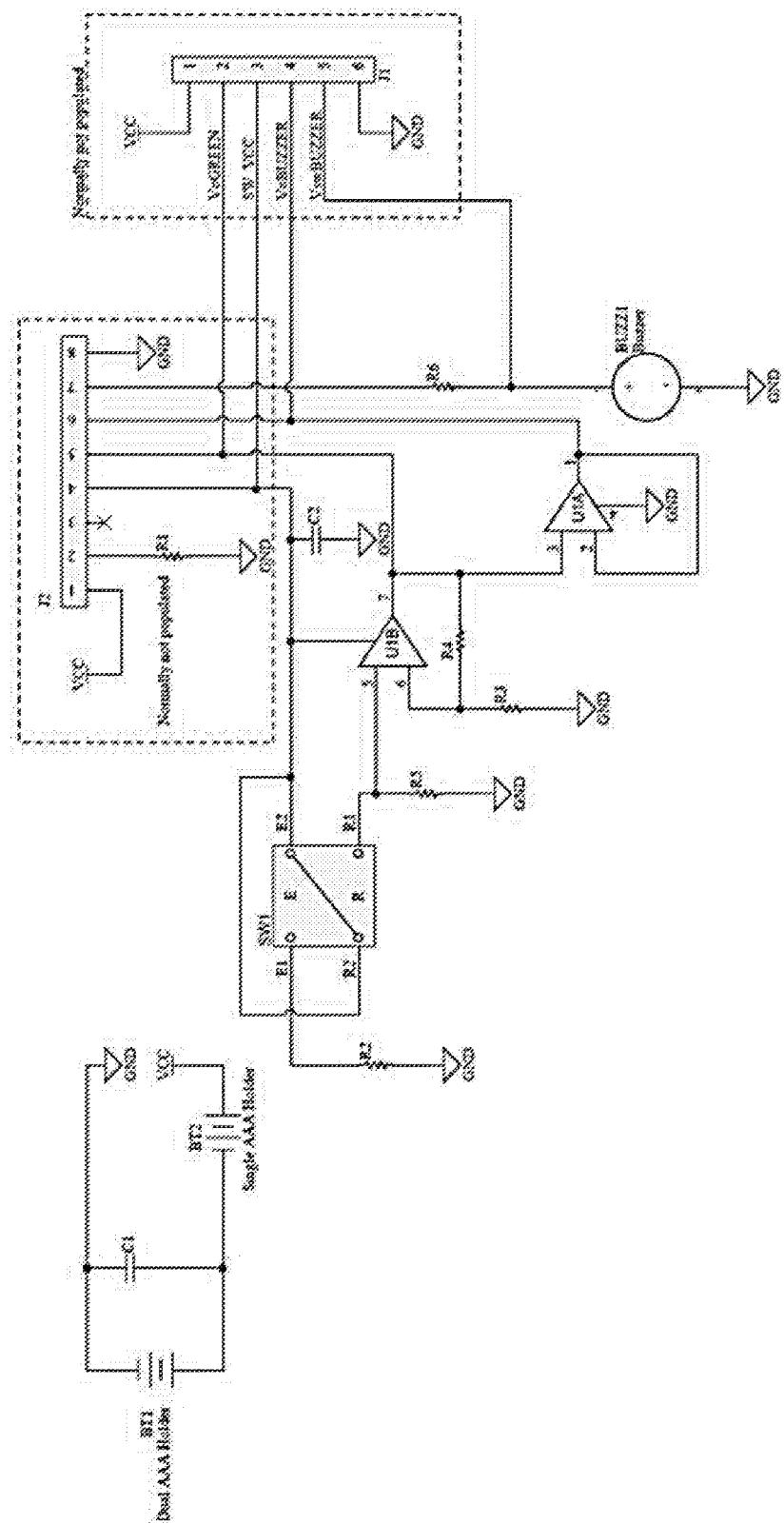
Figure 14:
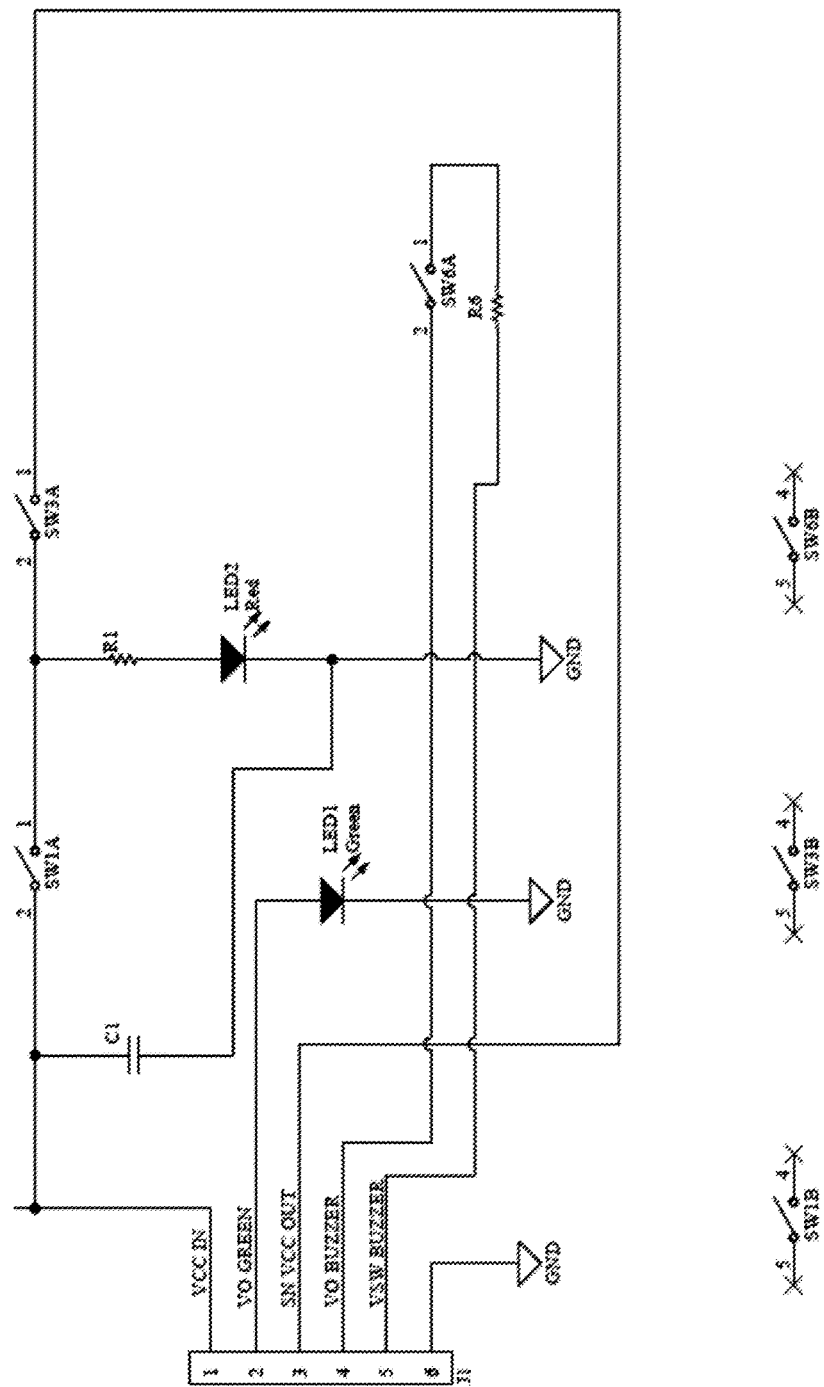
Figure 16A:
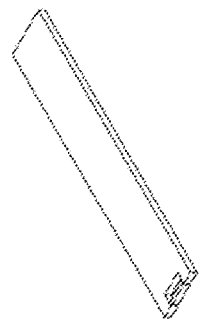
Figure 16B:
Figure 16C:
Figures 17A, 17B, 17C:
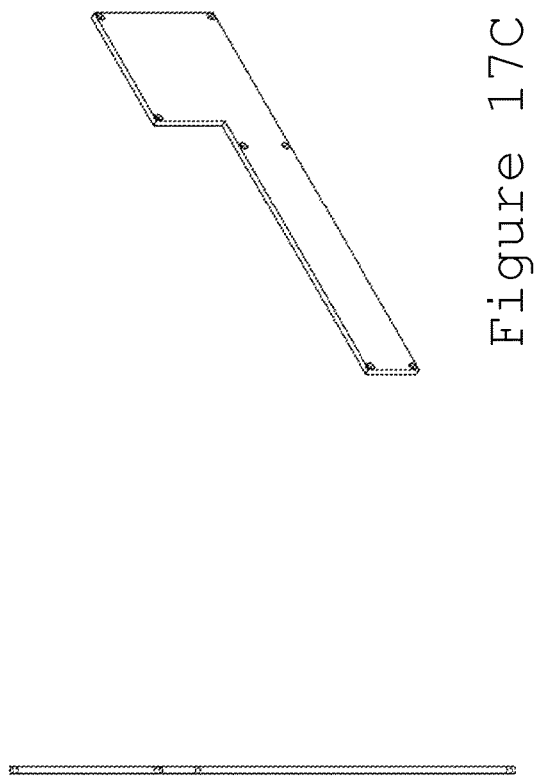
Figure 18:
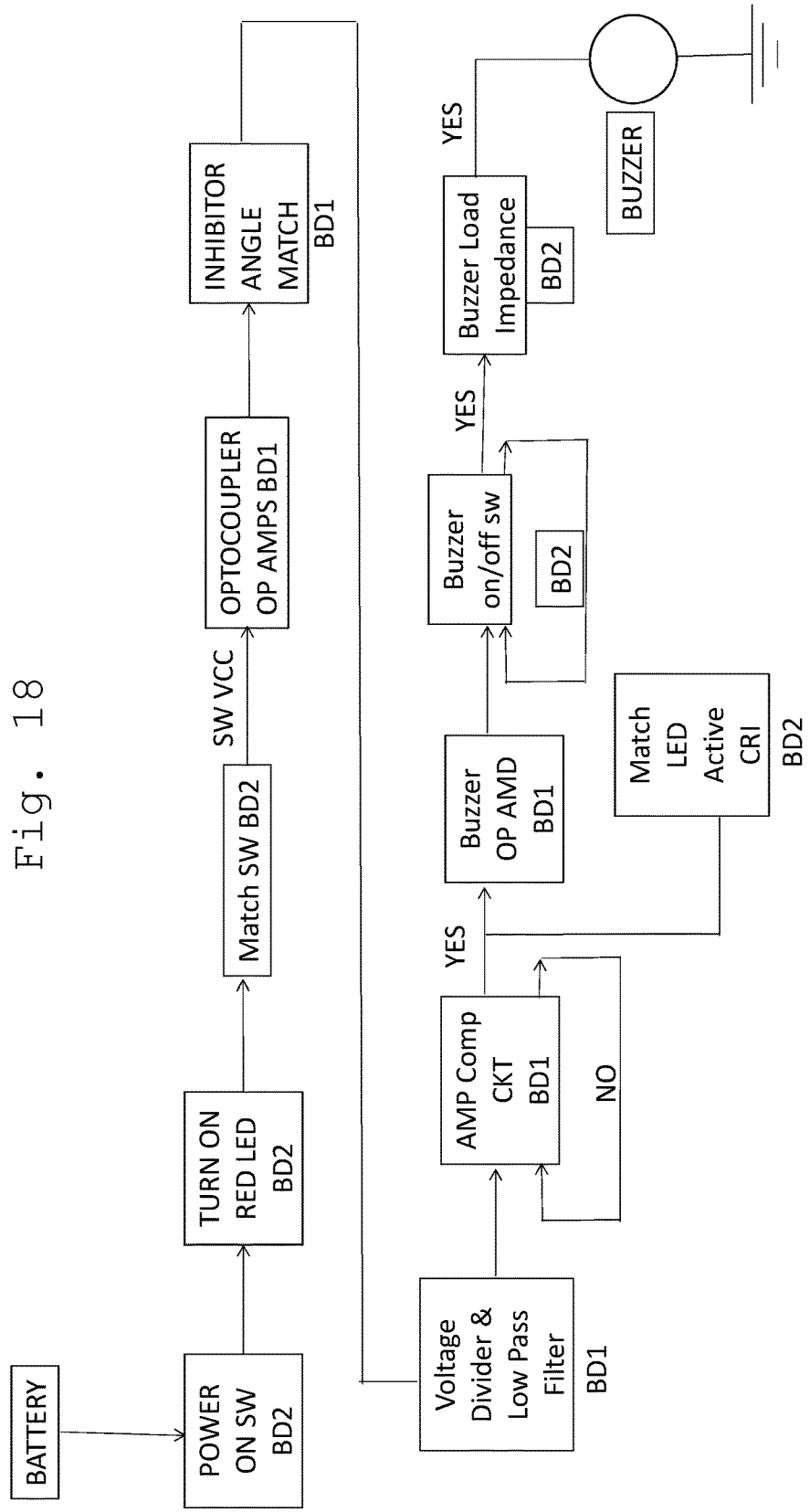

FIGS. 11A-C illustrate multiple views of an embodiment of the device exterior;

FIG. 12A illustrates a diagram for one embodiment of a low pass filter as utilized in the instant system;

FIG. 12B illustrates a diagram for one embodiment of a voltage divider as utilized in the instant system;

FIG. 13 illustrates the test printed circuit board production schematic print;

FIG. 14 illustrates the printed circuit board #002 schematic print;

FIGS. 15A-D illustrate multiple views of an embodiment of the device with the right side access door removed;

FIGS. 16A-C illustrate multiple views of an embodiment of the top access door;

FIGS. 17A-C illustrate multiple views of an embodiment of the right side access door; and, FIG. 18 is an operational flow diagram illustrating an example process for utilizing the instrument of the instant system to level an object.

DETAILED DESCRIPTION OF THE DISCLOSURE

The detailed description set forth below in connection with the appended drawings is intended as a description of presently preferred embodiments of the system and does not represent the only forms in which the present system may be constructed and/or utilized. The description sets forth the functions and the sequence of steps for constructing and operating the system in connection with the illustrated embodiments.

Figure 1:
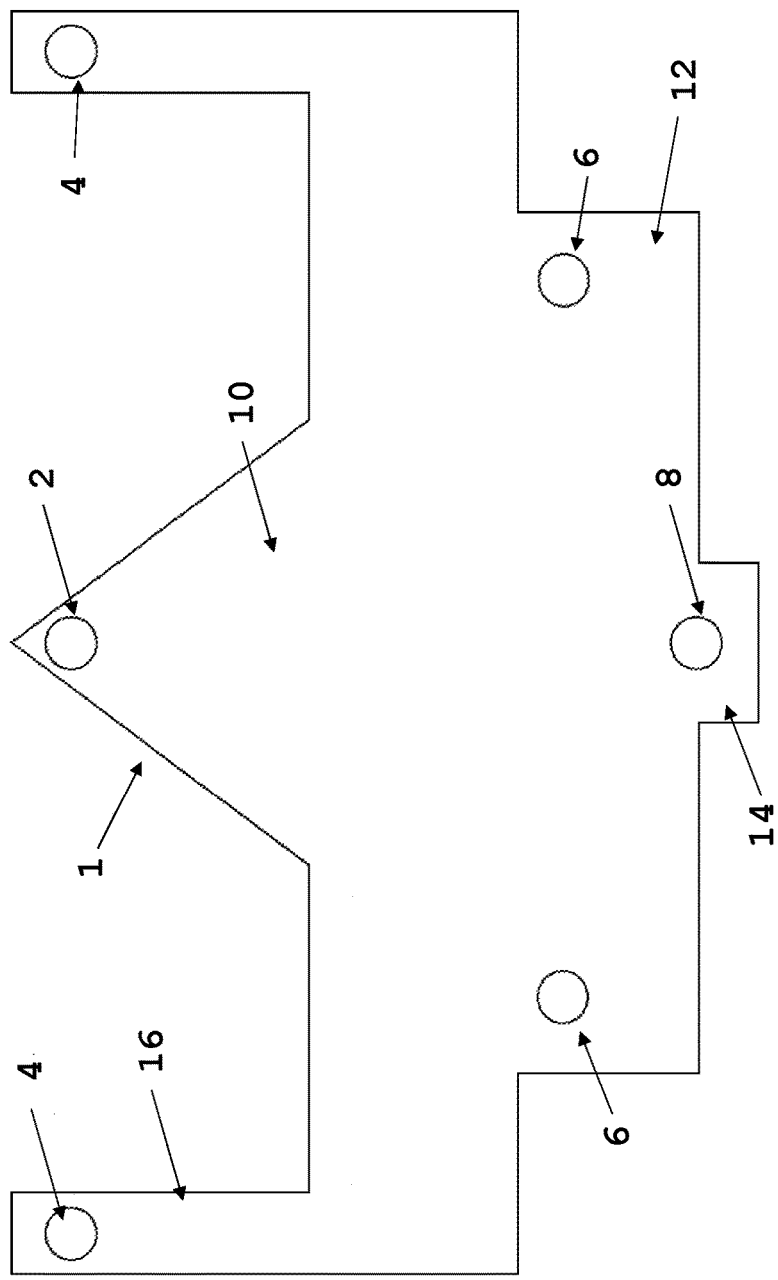
FIG. 1 illustrates a front view of an embodiment of the inhibitor.

Turning now descriptively to the drawings, FIG. 1 illustrates a front view of one embodiment of the inhibitor 1. This embodiment of the inhibitor 1 includes a triangular portion 10 in the center. In proximity to the top of the triangular portion 10 is a means of attaching the inhibitor 1 to a hanging structure. In one embodiment, the means of attaching the inhibitor 1 to a hanging structure is a hole 2. The inhibitor 1 has an arm 16 extending vertically on either side of the inhibitor 1.

In proximity to the end of each arm is a cut out or aperture designed for 90 degree leveling 4 (henceforth referred to as "the 90 degree cut outs"). The body portion 12 of the inhibitor 1 is substantially rectangular. There are two cut outs 6 (henceforth referred to as the 45 degree cut outs) in the body 12 of the inhibitor for 45 degree leveling. Near the base of the inhibitor 1 is a rectangular protrusion 14 with a cutout 8 (henceforth referred to as the horizontal cut out) for horizontal leveling.

Figure 2A:
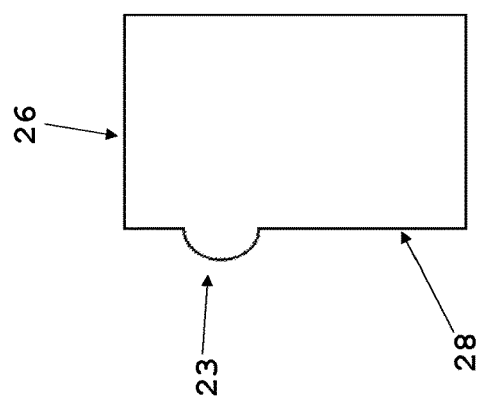
FIG. 2A illustrates a side view of the emitter and receiver.
Figure 2A:
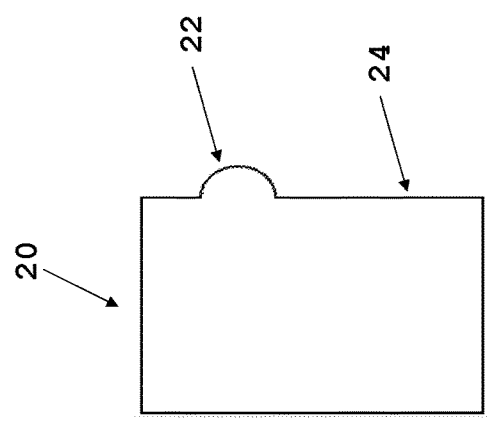

FIG. 2A illustrates a side view of the emitter 20 and the receiver 26. In this embodiment the body 24 of the emitter 20 is substantially rectangular however in other embodiments the emitter 20 may be shaped in any number of fashions to drive differing embodiments. The emitter 20 may possess at least one optocoupler. A first optocoupler 22 is illustrated in FIG. 2A on one side of the emitter 20.

An optocoupler device normally contains light-emitting and light-sensitive components, used to couple isolated circuits. Additionally, an optical coupler, also called opto-isolator, optocoupler, opto coupler, photocoupler or optical isolator, may act a passive optical component that can combine or split transmission data (optical power) from optical fibers. Additionally, an optocoupler may include an electronic device which is designed to transfer electrical signals by using light waves in order to provide coupling with electrical isolation between its input and output.

In many instances, the main purpose of an optocoupler is to prevent rapidly changing voltages or high voltages on one side of a circuit from distorting transmissions or damaging components on the other side of the circuit. An optocoupler contains a light source often near an LED which converts electrical input signal into light, a closed optical channel and a photosensor, which detects incoming light and either modulates electric current flowing from an external power supply or generates electric energy directly. The sensor can either be a photoresistor, a silicon-controlled rectifier, a photodiode, a phototransistor or a triac.

Many different kinds of optocouplers exist, the most common types categorized by number of channels, operating temperature, output voltage, isolation voltage, packaging type and current transfer ratio (CTR). The most common sizes for maximum output voltage are 30 V, 70 V and 80 V. The maximum operating temperature can range from 70° C. to 150° C., with the most common opto coupler chips having a maximum operating temperature of 100° C.

Additionally, in one embodiment, a voltage divider and low pass filter to pass optocoupler (receiver signal) may be utilized in order to provide noise suppression, in conjunction with ensuring faster response time. Such enhancements will also afford simultaneous disengagement of audio and LED systems.

In one embodiment, the overall system may utilize a unique enclosure to house comprising two Printed Circuit Boards (PCBs), wherein the main board is configured horizontally and a second set of board plugs configured vertically into the board. The boards may be secured to housing via screws and the system will additionally allow the user to removable access plate externally to change batteries and 3 control switches and 2 LEDs used in normal operation.

In one, the Main PCB has the on it the Batteries, Operation Amplifier (1) for buffering, gain, pulse shaping, driving a LED, and a 2nd operational amplifier that drives the buzzer if switch is depressed and system detects an angle match condition. The angle match condition occurs when user angle and system angle detection mechanism agree.

Additionally, the main PCB may include a connector to allow the second PCB to plug into it and let the use have access to Led indicator and control Switches. The main PCB also contains a voltage divider and low pass filter to suppress buzzer noise and reduce signal strength from Opto coupler receiver.

And, the LEDs may be utilized to indicate Power On & Angle Match which match to Switches: Power on, Match and Buzzer (Audio Match Indication). Normal angles are usually 0, +/−45 and +/−90 but any angle is possible with up to 18 multiple angles (equally spaced) and less depending on closeness to nearest neighbor due to light scattering.

In one operational mode, the user normally will have 3 or 4 angles 0, +/−30, +/−45 and +/−90 degrees (putting in additional angles is a very straightforward manufacturing process). The user depresses the Power Switch which allows battery power go come from main PCB and return to Main PCB conditioned by Power On Switch. A Red led will be activated on the enclosure to indicate system ready for use. All available angles will now give a match condition so user must have back understanding on angles and template on enclosure will help with desired angle.

Next, the user system must depress the Match Switch which allows power to the Amplifiers to compare the output from the receiver to see if the inhibitor has passed IR energy to the receiver or not. If the IR energy is received by receiver and exceeds the amp threshold, the amplifier's output activates the 2nd Op Amp ant turns on the Match LED. Subsequently, the 2nd Amplifier will then send a signal to the Buzzer switch and if depressed, will come back to main board and energize the buzzer for audio sound of 3 or 4 KHz depending on buzzer type.

The Audio and Led indicator thus effectively provides 360 degree coverage whereas normal levels give about +/−30 degrees. The opto emitter may always remain active so that when the angles from inhibitor matches the position of the electronic level, the receiver will activate circuits described above. Thus, the system essentially provides spherical viewing.

In one embodiment the body 28 of the receiver 26 is substantially rectangular, however in other embodiments the receiver 26 may be shaped in any number of fashions to drive differing embodiments. The receiver 26 has a second optocoupler 23 on one side. The emitter 20 and receiver 26 must be position such that the wave front travels widthwise in the system.

Figure 2C:
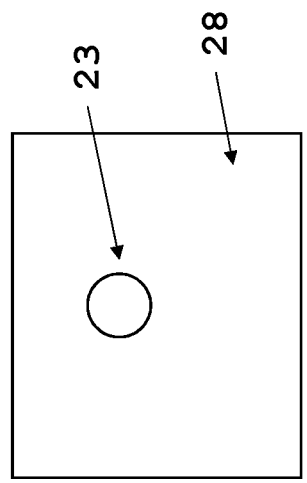
FIG. 2C illustrates a front view of the receiver.
Figure 2B:
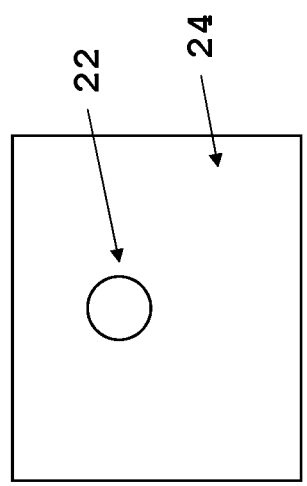
FIG. 2B illustrates a front view of the emitter.

FIG. 2B illustrates a front view of the emitter 20. In this embodiment the body 24 of the emitter 20 is substantially rectangular however in other embodiments the emitter 20 may be shaped in another fashion. The optocoupler 22 is placed near the center of the emitter's 20 body 24.

FIG. 2C illustrates a front view of the receiver 26. In this embodiment the body 28 of the receiver 26 is substantially rectangular however in other embodiments the receiver 26 may be shaped in another fashion. The optocoupler 23 is placed near the center of the receiver's 26 body 28.

Figure 3:
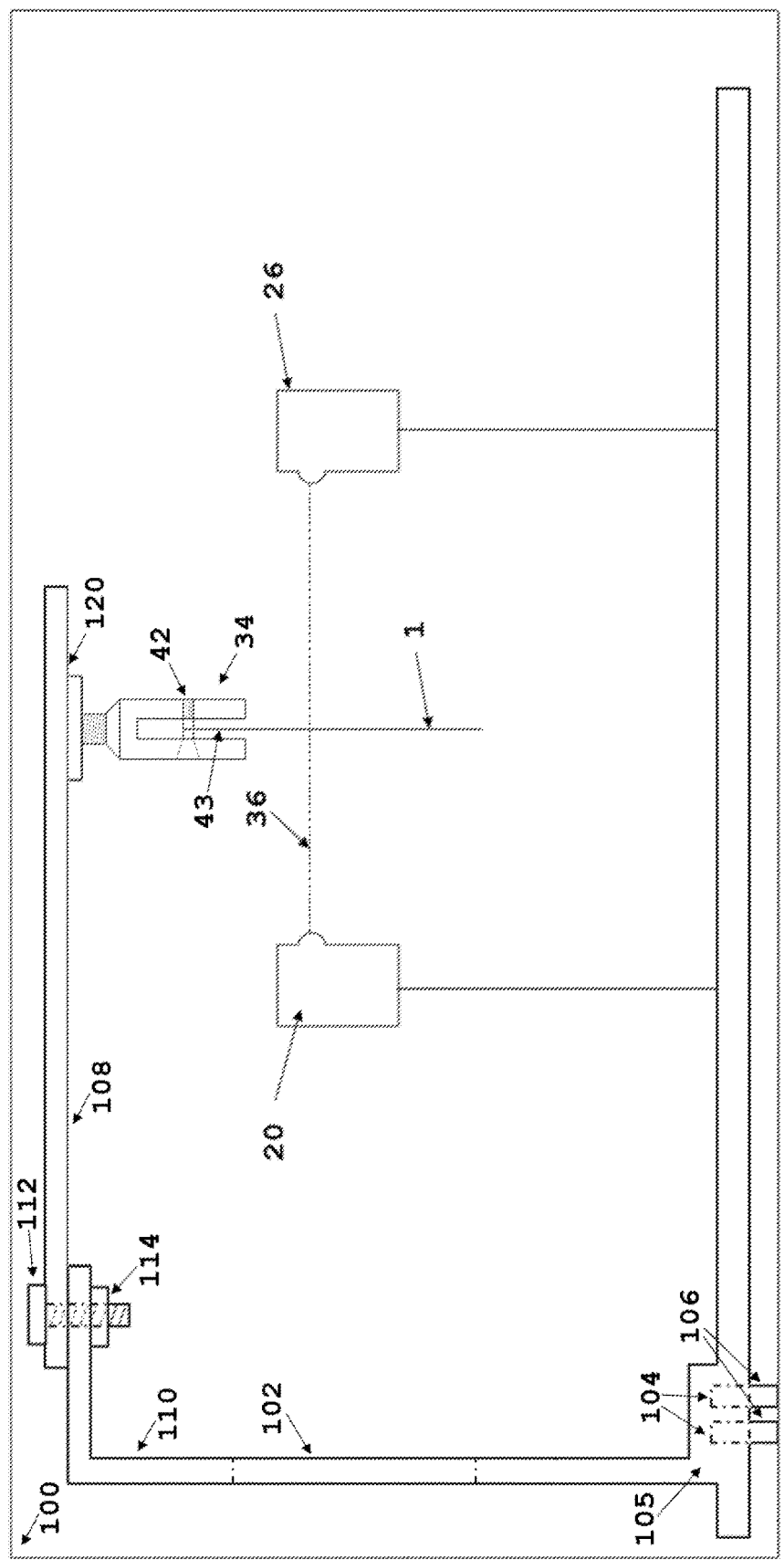
FIG. 3 illustrates a side view of an embodiment of the inside the device housing.

FIG. 3 illustrates an embodiment of the electronic laser level. The inhibitor 1 hangs from the inhibitor bracket 34. The inhibitor bracket is attached to 3 through an inhibitor bracket hole or inhibitor bracket aperture 120. The top member is attached to a mounting member 110. The top member 108 is attached to the mounting member with a screw 112 and a nut 114. A washer may also be placed between the nut 114 and the mounting member 110. On the side of the mounting member 110 is an alignment window 102. The mounting member 110 has a base portion 105. The base portion has two inhibitor mounting holes 104. The inhibitor mounting holes 104 match with mounting males 106. The entire device is contained in a device housing 100. The force of gravity ensures that the inhibitor 1 points toward the earth. In this embodiment the inhibitor bracket 34 allows the inhibitor 1 only one degree of freedom. The emitter 20 and the receiver 26 are placed on opposite sides of the inhibitor 1. The one degree of freedom allowed by the hanging member allows the inhibitor 1 to align itself in conformity with the forces of gravity. The emitter 20 and receiver 26 are both perpendicular with the object that is desired to be leveled is level. The emitter sends a signal 36 horizontally. In the preferred embodiment the signal 36 is an infrared laser beam, however in other embodiments the signal may be another type of visible or invisible beam.

If the emitter 20 and the receiver 26 are horizontally aligned, the signal 36 will pass through the inhibitor 1 and be caught be the receiver 26. When the receiver 26 receives a signal 36 from the emitter 20 it sends a signal to further circuitry to alert the user that the object 40 is level. When the object 40 is not level the beam 36 emitted by the emitter will not be able to pass through the aperture or hole 8 in the inhibitor 1. The beam 36 will bounce off the inhibitor 1. In this embodiment of the device the receiver 26 will not send a signal unless it receives a signal 36 from the emitter 20, however in other embodiments the receiver 26 may always send a signal unless it receives a signal 36 from the emitter 20 or it may send different a signal in both circumstances.

Figure 4:
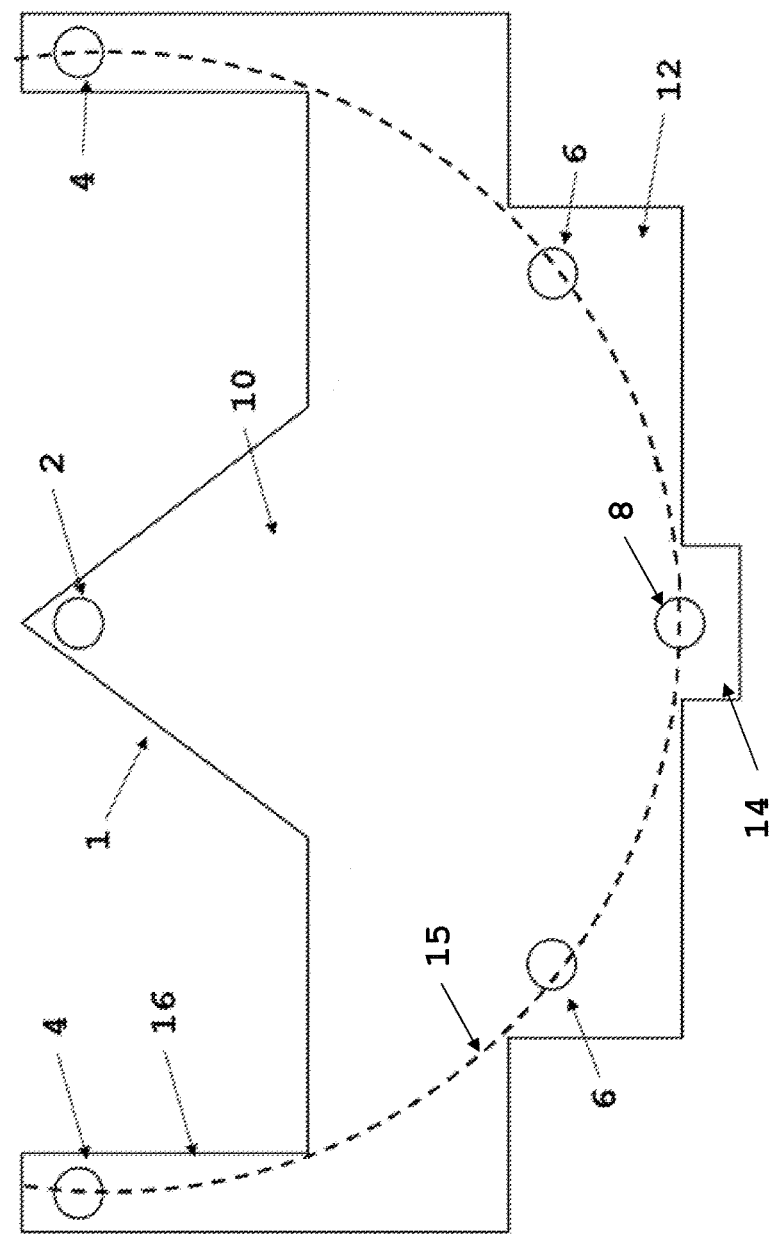
FIG. 4 illustrates the range of the beam on the inhibitor.

FIG. 4 illustrates a view of the inhibitor 1 with the range of the signal 15 illustrated on the inhibitor 1. As the inhibitor 1 swings within the device the range of the signal 15 can reach the 90 degree holes or 90 degree aperture 4 the 45 degree holes or 45 degree aperture 6 and the horizontal hole or horizontal aperture 8. When the device is in any other position the signal 36 is blocked by the body of the inhibitor 1.

Figure 5A:
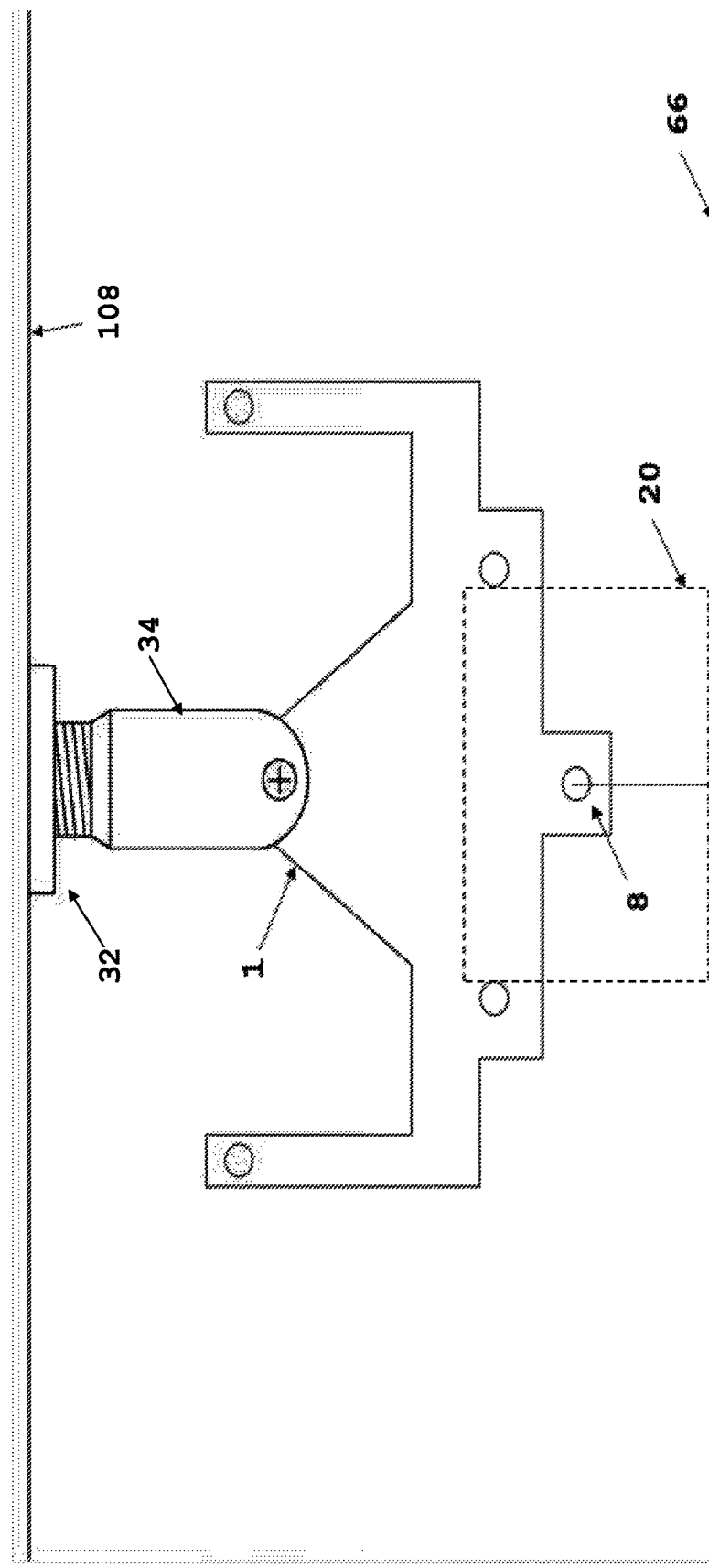
FIG. 5A illustrates a front view of the interior of the device in use leveling a horizontal object.

FIG. 5A illustrates an embodiment of the device applied to a horizontal object 66. When the device is placed on an object, the top member 108, the emitter 20, and the receiver 26 will be perpendicular with the object. The force of gravity pulls the inhibitor 1 towards the earth's center. The inhibitor 1 is held by an inhibitor bracket 34. The inhibitor bracket is secured with a nut 32. When the device is level the emitter 20 will be aligned with the horizontal hole 8. When the emitter 20 is aligned with the horizontal hole 8 the signal 36 is allowed to pass through the horizontal hole 8 and reach the receiver 26. The receiver 26 can be adjusted to only read active when it receives a full signal 36, preventing it from reading active when part of the beam is covered by the inhibitor 1.

Figure 5B:
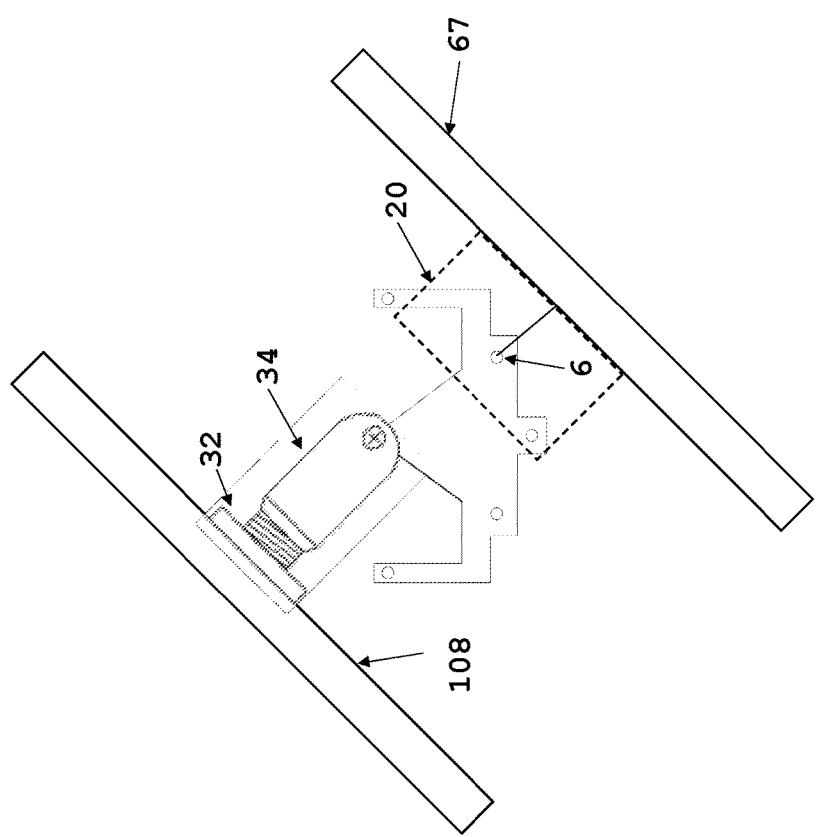
FIG. 5B illustrates a front view of the interior of the device in use leveling an object at a 45 degree angle.

FIG. 5B illustrates an embodiment of the device applied to an object positioned at a 45 degree angle 67. When the device is place on an object, the top member 108, the emitter 20, and the receiver 26 will be perpendicular with the object, which will orient these elements at a 45 degree angle. In this scenario, the force of gravity will inherently pull the inhibitor 1 toward the earth's center. When the device is at a 45 degree angle the emitter 20 will be aligned with the 45 degree hole 6. When the emitter 20 is aligned with the horizontal hole 6 the signal 36 is allowed to pass through the horizontal hole 6 and reach the receiver 26. The receiver 26 can be adjusted to only read active when it receives a full signal 36, preventing it from reading active when part of the beam is covered by the inhibitor 1.

FIG. 5C illustrates an embodiment of the device applied to an object positioned at a 90 degree angle 68. When the device is place on an object the top member 108, the emitter 20, and the receiver 26 will be perpendicular with the object, which will put them at a 90 degree angle in this scenario. The force of gravity pulls the inhibitor 1 towards the earth's center.

When the device is at a 90 degree angle the emitter 20 will be aligned with the 90 degree aperture 4, or hole. When the emitter 20 is aligned with the 90 degree hole 4, the signal 36 is allowed to pass through the 90 degree hole 4 and reach the receiver 26. The receiver 26 can be adjusted to only read active when it receives a full signal 36, preventing it from reading active when part of the beam is covered by the inhibitor 1.

FIG. 6A, illustrates an embodiment of the inhibitor bracket 34. In this embodiment the pivot point 42 is a screw that passes through the structure of the inhibitor bracket 34. In this embodiment the middle of the screw is substantially smooth, to reduce friction of the inhibitor 1, and the end is threaded to secure the screw 42. In this embodiment the hanging member has a threaded extension 43 that attaches to the top member 108, however the inhibitor bracket 34 may be attached to the top member 108 by other means as well. The device has a cavity 43 to allow the inhibitor 1 free a single degree of freedom.

FIG. 6B illustrates a front view of an embodiment of the inhibitor bracket 34. The pivot point is substantially centered on the structure.

Figure 6C:
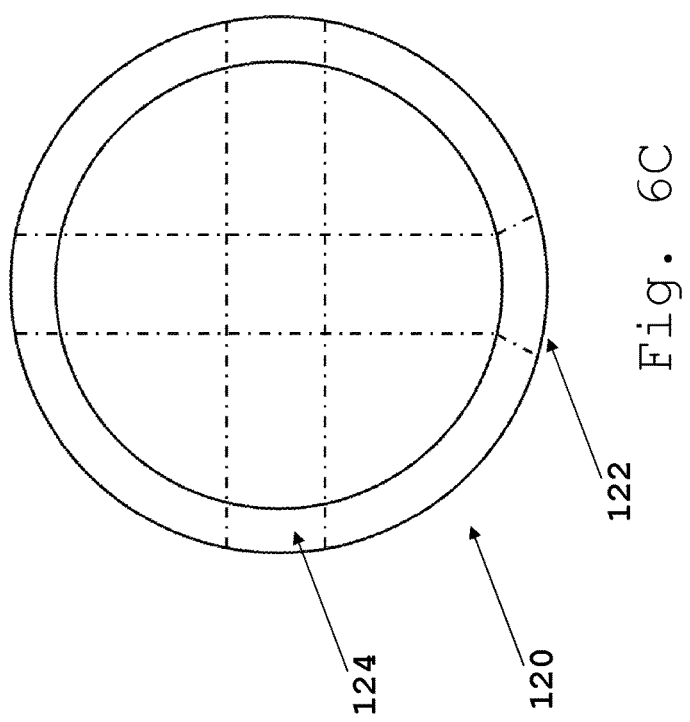
FIG. 6C illustrates a top cross sectional view of an embodiment of a hanging mechanism.

FIG. 6C illustrates a top view of an embodiment of the inhibitor bracket hole 120, disposed in the top or upper portion of the top member 108. In this embodiment the inhibitor bracket 34 hangs freely in the center of the inhibitor bracket hole or inhibitor bracket aperture 120. Additionally, in this embodiment the inhibitor bracket hole is substantially circular however, in other embodiments the inhibitor bracket aperture 120 may be shaped in another manner, including but not limited to a rectangle. Moreover, the inhibitor bracket aperture 120 may be sized to limit the degrees of freedom of the inhibitor bracket 34. In this embodiment the inhibitor bracket aperture 120 receives fasteners or screws 122, 124 to secure the inhibitor bracket 34.

Figure 7:
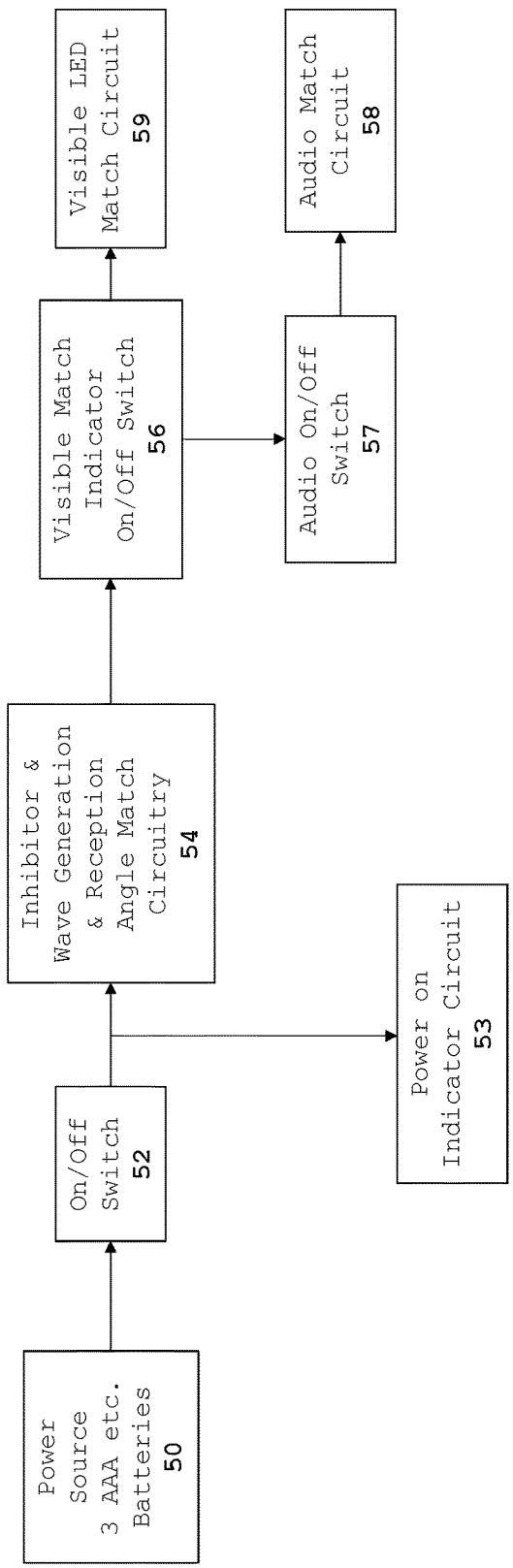
FIG. 7 illustrates a block diagram electronic laser level system.

FIG. 7 illustrates a block diagram of one embodiment of the device circuitry. The device may utilize a power source 50 which utilizes 3 AAA batteries in some embodiments, however the power source may be scaled to fit larger or smaller applications. The power source 50 is connected to a switch 52, which controls whether the device is on or off. The switch 52 is connected to a power on indicator circuit 53 and circuitry that controls and indicates the status of an inhibitor, wave generation, and reception angle match 54.

The inhibitor, wave generation, and reception angle match circuitry 54 is connected to an indicator switch 56 that controls whether a visible match indicator is on or off. The indicator switch is connected to an audio switch 57, which determines whether an audio match circuit 58 is active, and a visible LED match circuit 59.

Figure 8:
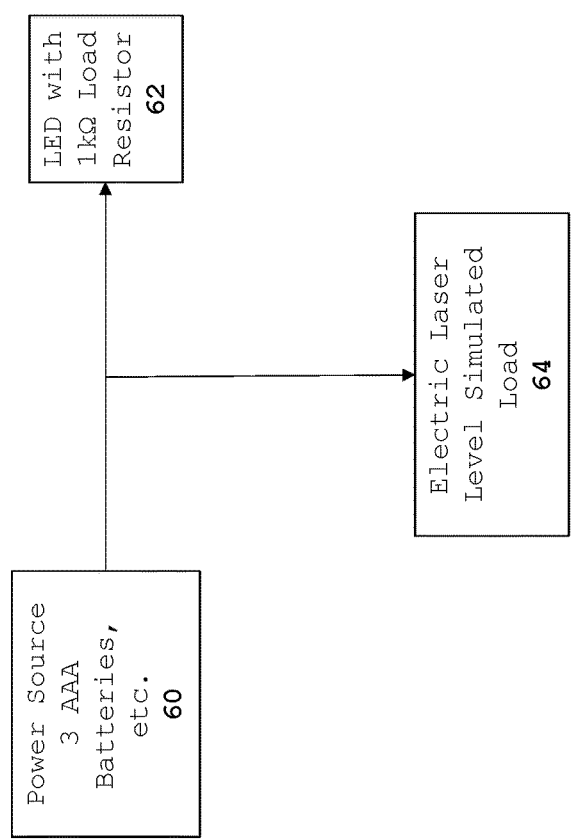
FIG. 8 illustrates a block diagram of the battery life test circuitry.

FIG. 8 illustrates a block diagram for one embodiment of a system to test how long battery loads will last within the system. The power source 60 is connected to a 1 kΩ resistor 62 and a load 64 proportional to the load of one embodiment of the electric laser level. This embodiment may use AAA batteries for a power source 60, however other power sources such as AA, 9 Volt, and 12 Volt batteries may be used.

Figure 9:
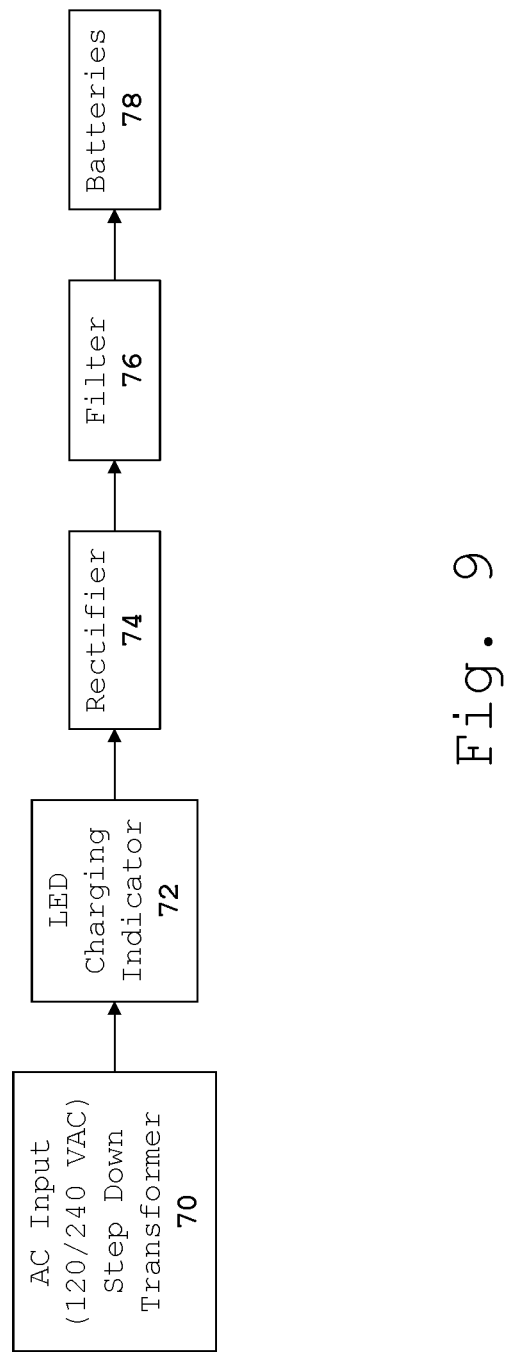
FIG. 9 illustrates a block diagram of the internal charging circuitry.

FIG. 9 illustrates a block diagram of the system for internal charging. And AC input step down transformer 70 is connected to a LED 72 that indicates whether the device is charging. The charge is then received by a rectifier 74 then to filter 76 and finally to the batteries 78.

Figure 10:
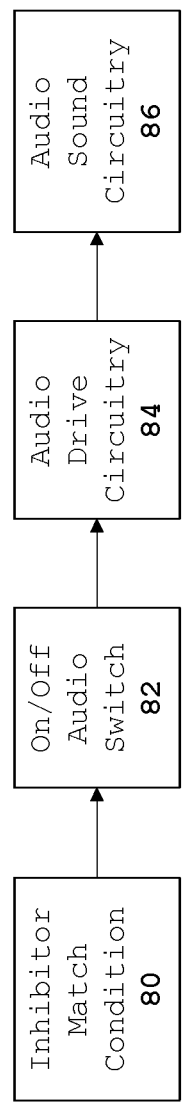
FIG. 10 illustrates a block diagram of the audio circuitry.

FIG. 10 illustrates a block diagram for the accompanying audio circuitry. First the circuitry determines the whether the inhibitor is in a match state 80. If it is and the audio switch is on 82 a signal is sent to the audio drive circuitry 84. The audio drive circuitry 84 transfers the signal to the audio sound circuitry 86.

FIGS. 11A-C illustrate an embodiment of the electric laser level housing. The housing 90 is a substantially square box with a single, substantially rectangular base 98, three switches: a power switch 91, a match switch 92, and an audio switch 93, as well as two LEDs: a power LED 94, and a match LED 95. Power switch 91 is a power switch that controls whether the device is on or off. Visible match switch 92 determines whether the LEDs in the system are on or off. The audio switch 93 thus controls whether the audio functions of the device are active. If the power switch 91 is active the power LED 94 will light up. If the visible match switch 92 and the power switch 91 are active and the device is level at a horizontal angle, then the match LED 95 will display a light.

Additionally, if the visible match switch 92 and the power switch 91 are active and the device is level at a 45 degree angle, then the LED 95 will display a light. Moreover, if the visible match switch 92 and the power switch 91 are active and the device is level at a 90 degree angle, then the LED 94 will display a light.

FIG. 12A illustrates a diagram for one embodiment of a low pass filter as utilized in the instant system and FIG. 12B illustrates a diagram for one embodiment of a voltage divider as utilized in the instant system. Additionally, FIG. 13 illustrates one embodiment of a test printed circuit board production schematic print and FIG. 14 illustrates one embodiment of a printed circuit board schematic print.

Furthermore, FIGS. 15A-D illustrate multiple views of an embodiment of the device with the right side access door removed, FIGS. 16A-C illustrate multiple views of an embodiment of the top access door and FIGS. 17A-C illustrate multiple views of an embodiment of the right side access door.

Finally, FIG. 18 is an operational flow diagram illustrating an example process for utilizing the instrument of the instant system to level an object.

The foregoing has outlined the more pertinent and important features of the present system in order that the detailed description of the system that follows may be better understood, and the present contributions to the art may be more fully appreciated. It is of course not possible to describe every conceivable combination of components and/or methodologies, but one of ordinary skill in the art may recognize that many further combinations or permutations are possible. Accordingly, the novel architecture described below is intended to embrace all such alterations, modifications, and variations that fall within the spirit and scope of the appended claims.

What is claimed is:
1. An electronic level mechanism comprising:
   a device housing;
   at least one printed circuit board;
   an inhibitor housing;
   an inhibitor comprising:
     a triangular portion, wherein the triangular portion comprises an attachment aperture;
     at least two arms, wherein each individual of the at least two arms comprises a ninety degree aperture;

wherein a first of the at least two arms extends vertically on a first side of the inhibitor and wherein a second of the at least two arms extends vertically on a second side of the inhibitor;
a substantially rectangular body comprising at least two forty five degree apertures;
a base comprising a rectangular protrusion and a aperture for horizontal leveling;
an emitter comprising at least one optocoupler and a transmitter for transmitting at least one beam;
a receiver comprising at least one optocoupler;
wherein the inhibitor housing, emitter and receiver are located inside the device housing;
a power switch;
a match switch;
a power LED;
a match LED;
an LED located on the device housing;
at least one printed circuit board ("PCB") comprising a first amplifier and a second amplifier;
wherein actuation of the power switch allows power to flow through the main PCB and to return to first PCB conditioned and allows the LED to be activated and that indicate system ready for use and provide a match condition at a set of angles; and
wherein subsequent actuation of the match switch allows power to flow to the first amplifier and the second amplifier for comparison of the output from the receiver to see when the inhibitor has passed infrared ("IR") energy to the receiver or when IR energy reaches the receiver and exceeds a threshold of the second amplifier, the second amplifier's output activates the Match LED as the level mechanism is oriented at different levels on a work piece and the emitter passes the at least one beam through the appropriate opening in the inhibitor when the predetermined selected position is achieved.

2. The electronic level mechanism of claim 1 wherein the inhibitor is mounted to and extends from the inhibitor housing, and wherein the inhibitor is located between the emitter and the receiver.

3. The electronic level mechanism of claim 1 wherein the inhibitor comprises a substantially flat member comprising a set of apertures.

4. The electronic level mechanism of claim 1 further comprising a hanging mechanism wherein the inhibitor hangs from the upper portion of the by a hanging mechanism.

5. The electronic level mechanism of claim 4 wherein the hanging mechanism comprises a set of pivot points.

6. The electronic level mechanism of claim 4 wherein the hanging mechanism is constrained and thus comprises a set of at least two degrees of adjustment.

7. The electronic level mechanism of claim 1 wherein the upper portion of the inhibitor housing comprises an aperture for mounting of the hanging mechanism.

8. The electronic level mechanism of claim 7 wherein the upper portion of the inhibitor housing comprises an aperture is constructed to allow at least one degree of freedom.

9. The electronic level mechanism of claim 1 wherein the upper portion of the inhibitor housing comprises an extrusion mechanism to for retention of the hanging mechanism.

10. The electronic level mechanism of claim 1 wherein the electronic level mechanism is powered by a set of batteries to actuate an indicator circuit, a wave generator, a receiver, a visible match indicator, and an audio match indicator.

11. The electronic level mechanism of claim 10 wherein the set of batteries is charged by an AC Input.

12. The electronic level mechanism of claim 1 wherein the electronic level mechanism is controlled by a power switch, a visible match switch and an audio switch.

13. The electronic level mechanism of claim 1 wherein at least one LED readout indicates if the device is level.

14. The electronic level mechanism of claim 1 wherein at least one LED indicates the current angle of the power activation.

15. A level system comprising:
a device housing;
an inhibitor housing;
an inhibitor mechanism comprising:
    a triangular portion comprising an attachment mechanism located substantially in an upper center portion of the triangular member;
    a body portion comprising a set of apertures for 45 degree leveling and further comprising a set of arms extending vertically on either side of the triangular center portion, wherein each arm comprises an aperture for 90 degree leveling; and
    a base portion comprising a rectangular protrusion comprising a horizontal cutout for horizontal leveling;
an emitter comprising an energy beam; and
a receiver, wherein the inhibitor housing, emitter and receiver are located inside the device housing;
an inhibitor bracket;
wherein the inhibitor is attached to and hangs freely from the inhibitor bracket to allow the inhibitor to move with gravity in one degree of freedom in order to allow the energy beam to span the inhibitor body for apertures;
wherein as the inhibitor swings within the device housing, the range of the signal can reach the 90 degree apertures or 45 degree aperture and the horizontal aperture;
wherein the emitter sends a signal horizontally and wherein when the emitter and the receiver are horizontally aligned, the signal will pass through the inhibitor and be caught be the receiver;
wherein when the receiver obtains a signal from the emitter, the receiver sends a signal to a set of circuitry that controls and indicates the status of an inhibitor, wave generation, and reception angle match to alert to the user that the object is level and wherein when the emitter passes the energy beam through the set of apertures of located on the arms and the body portion of the inhibitor when a predetermined selected position which is identified by an angle representation internal to the device is achieved.

16. The level system of claim 15 wherein the level system is controlled by a power switch, a visible match switch and an audio switch.

17. The level system of claim 15 wherein further comprising at least one LED readout which indicates that the device is level.

* * * * *